United States Patent
Fujikawa

(10) Patent No.: US 10,929,518 B2
(45) Date of Patent: Feb. 23, 2021

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Ryo Fujikawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 16/233,559

(22) Filed: Dec. 27, 2018

(65) Prior Publication Data
US 2019/0213317 A1 Jul. 11, 2019

(30) Foreign Application Priority Data

Jan. 5, 2018 (JP) .............................. JP2018-000769

(51) Int. Cl.
*G06F 21/33* (2013.01)
*G06F 21/44* (2013.01)
*H04L 9/32* (2006.01)
*H04L 29/06* (2006.01)

(52) U.S. Cl.
CPC .............. *G06F 21/33* (2013.01); *G06F 21/44* (2013.01); *H04L 9/3268* (2013.01); *H04L 63/0823* (2013.01)

(58) Field of Classification Search
CPC ....... G06F 21/33; G06F 21/44; H04L 9/3268; H04L 63/0823
See application file for complete search history.

(56) References Cited

U.S. PATENT DOCUMENTS

| | | | |
|---|---|---|---|
| 2007/0028097 A1* | 2/2007 | Masui ................. | H04L 63/0442 713/156 |
| 2013/0132718 A1* | 5/2013 | Agrawal ............... | H04L 9/3268 713/158 |
| 2018/0069850 A1* | 3/2018 | Takazoe ................ | H04L 63/068 |

FOREIGN PATENT DOCUMENTS

JP 2016072757 A 5/2016

* cited by examiner

*Primary Examiner* — Nelson S. Giddins
(74) *Attorney, Agent, or Firm* — Venable LLP

(57) ABSTRACT

The present invention provides an information processing apparatus that stores digital certificates. The information processing apparatus selects a digital certificate among the digital certificates stored in the storing unit in accordance with an instruction of a user, obtains an expiration date of the selected digital certificate and revocation information on the selected digital certificate. The information processing apparatus determines validity of the selected digital certificate on a basis of the obtained expiration date and the obtained revocation information and sets the digital certificate determined to be valid as a digital certificate for communication.

6 Claims, 4 Drawing Sheets

FIG. 2A

SSL KEY SETTING SCREEN

| SELECT | NAME OF KEY | USE TARGET OF KEY | CERTIFICATE |
|--------|-------------|-------------------|-------------|
| ● | Default Key | | ☐ |
| ○ | Key 1 | | ☐ |
| ○ | Key 2 | IEEE802.1X | ☐ |
| ○ | Key 3 | IPSec | ☐ |
| ○ | Key 4 | | ☐ |
| ○ | Key 5 | | ☐ |

SETTING

FIG. 2B

SSL KEY SETTING SCREEN

| SELECT | NAME OF KEY | USE TARGET OF KEY | CERTIFICATE |
|--------|-------------|-------------------|-------------|
| ○ | Default Key | | ☐ |
| ○ | Key 2 | IEEE802.1X | ☐ |
| ○ | Key 3 | IPSec | ☐ |
| ○ | Key 4 | | ☐ |
| ● | Key 5 | SSL | ☐ |

SETTING

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the information processing apparatus, and a storage medium.

Description of the Related Art

In the related art, an information processing apparatus that verifies the validity of a digital certificate (digital certificate) at the start of network communication is known (see, for example, Japanese Patent Laid-Open No. 2016-72757). The information processing apparatus disclosed in Japanese Patent Laid-Open No. 2016-72757 inquires of a server about the validity of a digital certificate at the start of communication and, when the digital certificate is not valid, again automatically performs the inquiry about the validity after a predetermined time has elapsed. Then, the network connection is validated on the basis of a digital certificate in a valid state. In the above-mentioned document, even when the digital certificate is temporarily invalidated, communication can be performed without reducing usability and/or operability by retrying the inquiry about the validity.

However, in a case that the validity of a certificate is verified at the start timing of communication as in the above-described known technology, the fact that the certificate cannot be used is not recognized until the start of the communication. Accordingly, the communication planned to be executed cannot be achieved until the certificate is updated, and the user convenience is disadvantageously affected.

In addition, in the information processing apparatus of the related art, although the digital certificate to be used in the communication can be designated, a digital certificate the validity of which cannot be confirmed can also be designated. Consequently, in a case that a digital certificate the validity of which is not guaranteed is registered as a certificate for communication, the communication is always determined to be disabled and cannot be executed in actual communication, and the usability and/or the operability are disadvantageously affected.

SUMMARY OF THE INVENTION

An aspect of the present invention is to eliminate the above-mentioned problem with conventional technology.

A feature of the present invention is to provide a technique in which an expired or revoked digital certificate is not set for communication to prevent the instruction for communication using a revoked digital certificate from being initiated.

According to a first aspect of the present invention, there is provided an information processing apparatus, comprising: a storing unit configured to store digital certificates; a controlling portion having a processor that executes instructions stored in a memory or having a circuitry, the controlling portion functioning as: a selecting unit configured to select a digital certificate among the digital certificates stored in the storing unit in accordance with an instruction of a user; a first obtaining unit configured to obtain an expiration date of the digital certificate selected by the selecting unit; a second obtaining unit configured to obtain revocation information on the digital certificate selected by the selecting unit; a determining unit configured to determine validity of the digital certificate selected by the selecting unit on a basis of the expiration date obtained by the first obtaining unit and the revocation information obtained by the second obtaining unit; and a setting unit configured to set the digital certificate determined to be valid by the determining unit as a digital certificate for communication.

According to a second aspect of the present invention, there is provided a method of controlling an information processing apparatus including a memory storing digital certificates, the method comprising: selecting a digital certificate among the digital certificates stored in the memory in accordance with an instruction of a user; obtaining an expiration date of the digital certificate selected in the selecting; obtaining revocation information on the digital certificate selected in the selecting; determining validity of the digital certificate selected in the selecting on a basis of the obtained expiration date and the obtained revocation information; and setting the digital certificate determined to be valid in the determining as a digital certificate for communication.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B depict views illustrating exemplary setting screens for setting an SSL key from among certificates stored in a key certificate region of an HDD of the multi-function peripheral according to the first exemplary embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. In the present exemplary embodiment, an exemplary information processing apparatus (digital multi-function peripheral: Multi-function Peripheral (MFP)) which performs communication using a digital certificate is described. Typically, however, a key and/or a certificate is used in some situation in a process via a network, and therefore the application range is not limited to a multi-function peripheral. In addition, the communication using a digital certificate can be performed on either side, namely, the client side or the server side.

First Exemplary Embodiment

Figure 1:
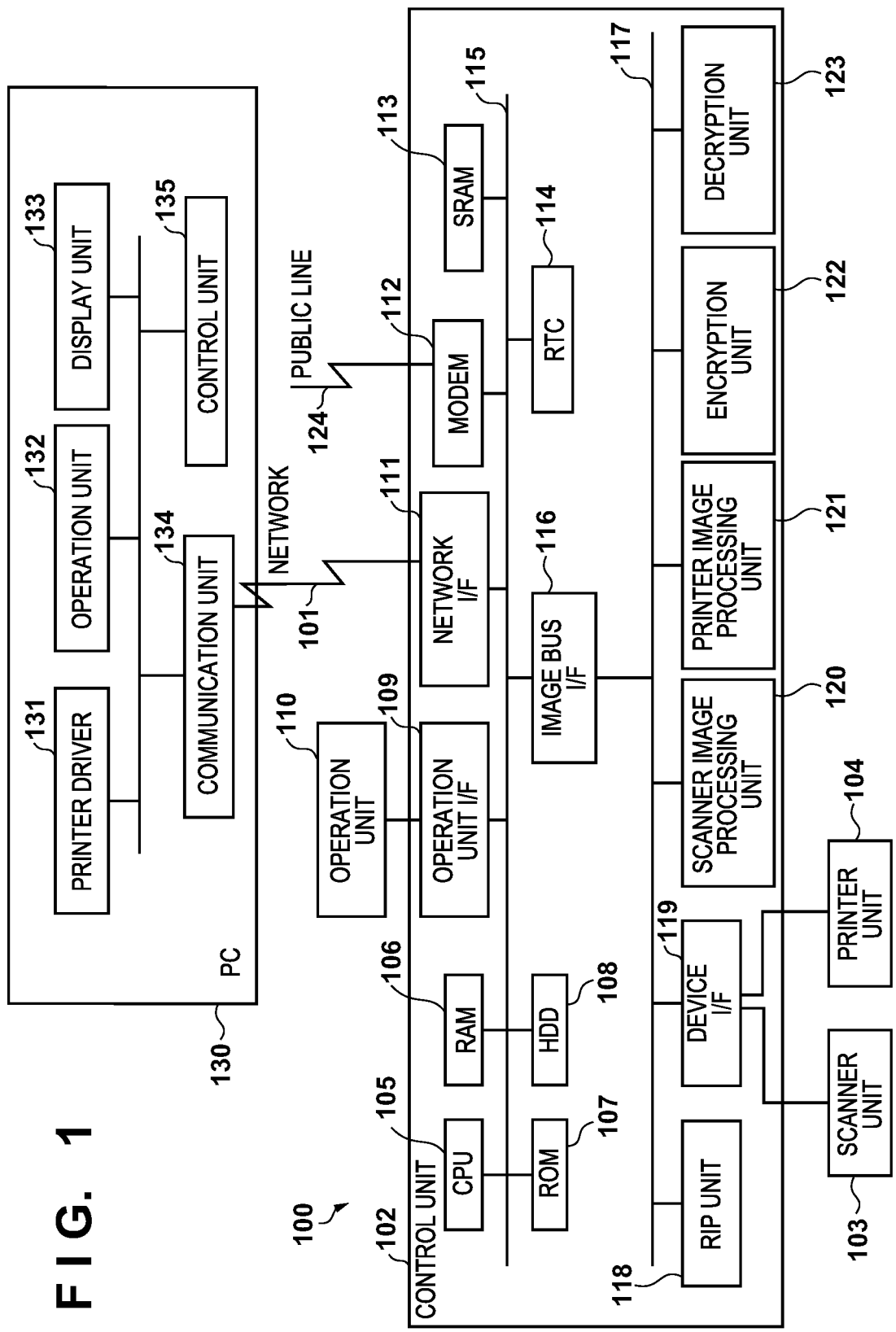
FIG. 1 is a block diagram for describing a configuration of a multi-function peripheral, which is an example of an information processing apparatus according to the first exemplary embodiment of the present invention, and a configuration of an information processing system including the multi-function peripheral.

FIG. 1 is a block diagram for describing a configuration of a multi-function peripheral (MFP) 100, which is an example of an information processing apparatus according to the first exemplary embodiment of the present invention, and a configuration of an information processing system including the multi-function peripheral 100.

This information processing system includes the multi-function peripheral 100 and a client PC 130, and the multi-function peripheral 100 and the client PC 130 are connected with each other via a network such as a network 101 and a public telephone network 124. The multi-function peripheral 100 receives a print job and the like from the client PC 130.

The multi-function peripheral 100 includes a control unit 102, a printer unit 104, a scanner unit 103, and an operation unit 110. The control unit 102 includes a CPU 105, a RAM 106, a ROM 107, and an HDD 108 including a key certificate region for storing a key certificate. Further, the control unit 102 includes an SRAM 113, an operation unit I/F 109, a network I/F 111, a modem 112, and a Real Time Clock (RTC) 114, which are connected with one another with a system bus 115 therebetween. Further, the control unit 102 includes a Raster Image Processor (RIP) unit 118, a device I/F 119, a scanner image processing unit 120, a printer image processing unit 121, an encryption unit 122, and a decryption unit 123, and these components are connected with one another with an image bus 117 therebetween. The system bus 115 is connected with the image bus 117 with an image bus I/F 116 therebetween. The operation unit I/F 109, the network I/F 111 and the modem 112 are connected with the operation unit 110, the network 101, and the public telephone network 124, respectively, and the device I/F 119 is connected with the printer unit 104 and the scanner unit 103.

For example, the printer unit 104 prints image data obtained by the scanner unit 103 on a sheet. The scanner unit 103 reads a document, and outputs image data obtained by reading the document. The operation unit 110 includes a display unit having a function of a touch panel and a hard key, and a user inputs an instruction to the multi-function peripheral 100 by operating the display unit and/or the hard key.

The CPU 105 executes a boot program stored in the ROM 107 to deploy a program stored in the HDD 108 in the RAM 106, and executes the deployed program to control the entire operation of the multi-function peripheral 100. The RAM 106 is a system work memory of the CPU 105, and temporarily stores a program to be executed by the CPU 105, image data, information received by the operation unit 110, and the like. The HDD 108 is a nonvolatile storage apparatus and stores a digital certificate in which the validity of the digital certificate is guaranteed in communication, for example. Further, the HDD 108 stores a self-signature certificate and/or a certificate with signature in the key certificate region.

The SRAM 113 is a nonvolatile storage medium which operates at a high speed, and stores various types of programs, various types of data, and the like. The modem 112 transmits and/or receives information via the public telephone network 124. The RTC 114 clocks date and time even when power is not supplied to the control unit 102. The RIP unit 118 converts image data described with a page description language into bitmap image data, for example. The scanner image processing unit 120 performs various processes such as corrections, processing, and edits on image data generated by the scanner unit 103. The printer image processing unit 121 performs various processes such as corrections, resolution conversions, and halftone processes on image data to be output to the printer unit 104. The encryption unit 122 performs an encryption process on data received by the multi-function peripheral 100, and the decryption unit 123 performs a decryption process on data on which the encryption process has been performed.

The PC 130 includes a printer driver 131, a console unit 132, a display unit 133, a communication unit 134 and a control unit 135, and the communication unit 134 is connected with the network 101. The printer driver 131 generates a print job on the basis of image data generated by an application. Various printing conditions are set in the generated print job. The console unit 132 is an input device including a pointing device and/or a keyboard, for example. The display unit 133 is a monitor having a function of a touch panel, and displays a variety of information, for example. The communication unit 134 transmits a print job and the like to the multi-function peripheral 100 via the network 101. The control unit 135 includes a CPU (not shown), a memory (not shown) that stores instructions to be executed by the CPU, and controls the operation of the PC 130.

FIGS. 2A and 2B depict views illustrating exemplary setting screens for setting a Secure Sockets Layer (SSL) key among from certificates stored in the key certificate region of the HDD 108 of the multi-function peripheral 100 according to the first exemplary embodiment.

FIG. 2A illustrates an exemplary setting screen for setting an SSL key from a list of the certificates stored in the key certificate region, and illustrates a state that a default key is selected.

Figure 3:
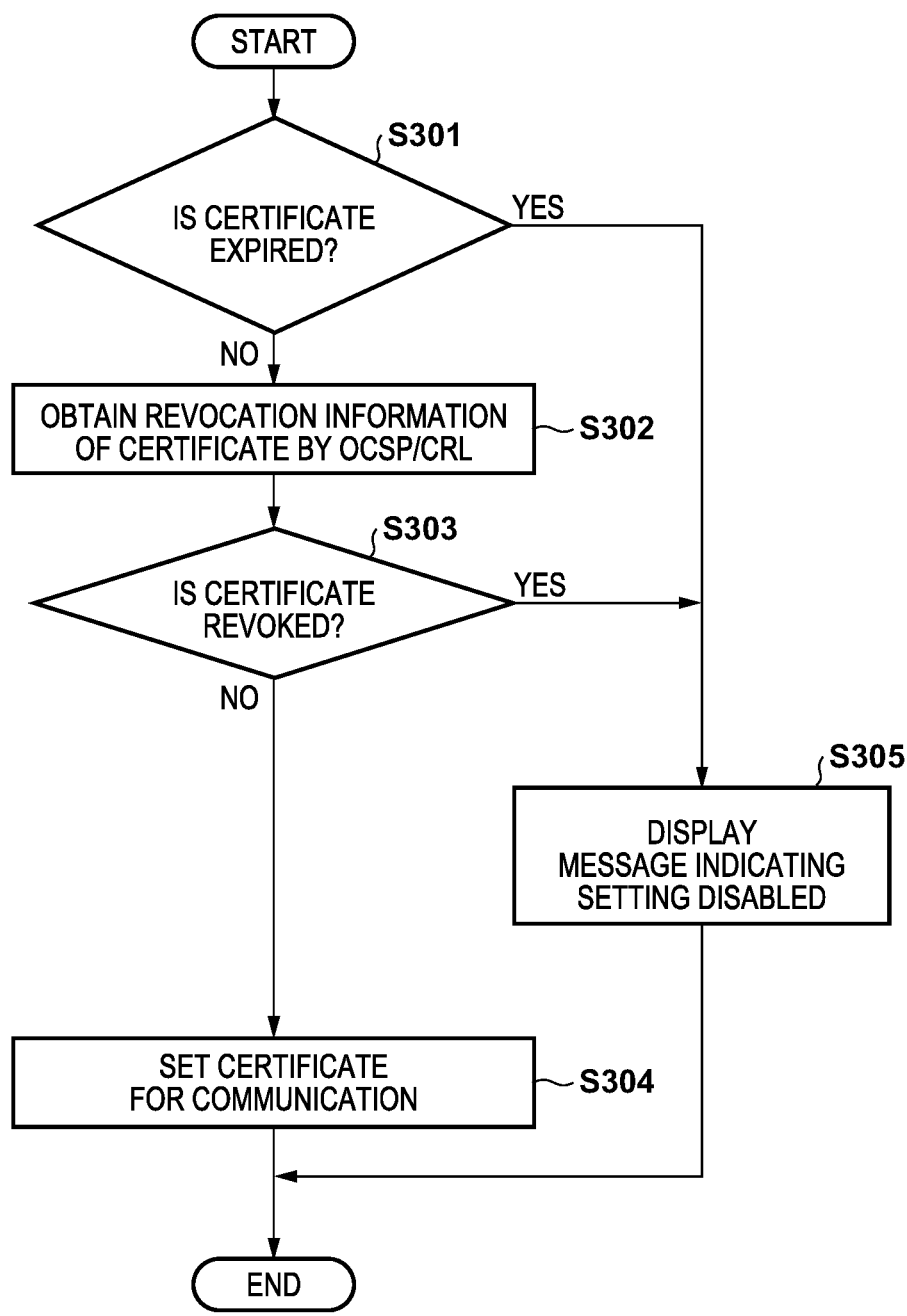
FIG. 3 is a flowchart for describing a process of setting a certificate for SSL/TLS communication in the multi-function peripheral according to the first exemplary embodiment.

FIG. 3 is a flowchart for describing a process of setting a certificate for SSL/Transport Layer Security (TLS) communication in the multi-function peripheral 100 according to the first exemplary embodiment. Note that the process illustrated in the flowchart is achieved by executing a program deployed in the RAM 106 by the CPU 105. Note that this flowchart assumes that a certificate with a signature is present in the certificates stored in the key certificate region of the HDD 108.

The process is started when a certificate for communication is selected by the user via the operation unit 110. First, in step S301, the CPU 105 refers to the HDD 108 to obtain the information on the certificate selected by the user and determines whether or not the certificate is expired. Here, if it is determined that the certificate is expired, the process proceeds to step S305, and the CPU 105 causes the operation unit 110 to display a message indicating that the setting using the certificate is disabled, and then, terminates the process.

If the CPU 105 determines that the certificate is not expired in step S301, the process proceeds to step S302, and the CPU 105 obtains, from the HDD 108, revocation information on the certificate from a Certification Revocation List (CRL) downloaded from a certificate authority. In addition, revocation information on the certificate is obtained from an Online Certificate Status Protocol (OCSP) server by using an OCSP. Then, the process proceeds to step S303, and the CPU 105 determines whether or not the certificate selected by the user is revoked on the basis of the revocation information. Here, if the certificate selected by the user is determined to be revoked, the process proceeds to step S305, a message indicating that the setting using the certificate is disabled is displayed on the operation unit 110, and the process is terminated.

If the CPU 105 determines that the certificate selected by the user is not revoked in step S303, the process proceeds to step S304, and the certificate selected by the user is set as a certificate for the communication, and then, the process is terminated.

Thus, the unrevoked certificate selected by the user is used when communication between the multi-function peripheral 100 and the client PC 130 is executed.

As described above, in the first exemplary embodiment, in a case that the certificate selected by the user is not an unrevoked certificate, the certificate is set as a certificate to be used for communication, and thus highly reliable communication can be executed. Further, since a certificate revocation error which is caused when a revoked certificate is mistakenly set and the like can be prevented, a disadvantageous influence on user's operability and usability can be prevented.

Second Exemplary Embodiment

Next, a second exemplary embodiment of the present invention is described. In the second exemplary embodiment, an exemplary case is described that, when a certificate selected by a user is a revoked certificate, a search for an unrevoked certificate stored in the key certificate region is performed and the unrevoked certificate is presented to the user. Note that the multi-function peripheral 100, the PC 130, and the system configuration including the multi-function peripheral 100 and the PC 130 according to the second exemplary embodiment are similar to those of the first exemplary embodiment, and therefore the description thereof will be omitted.

Figure 4:
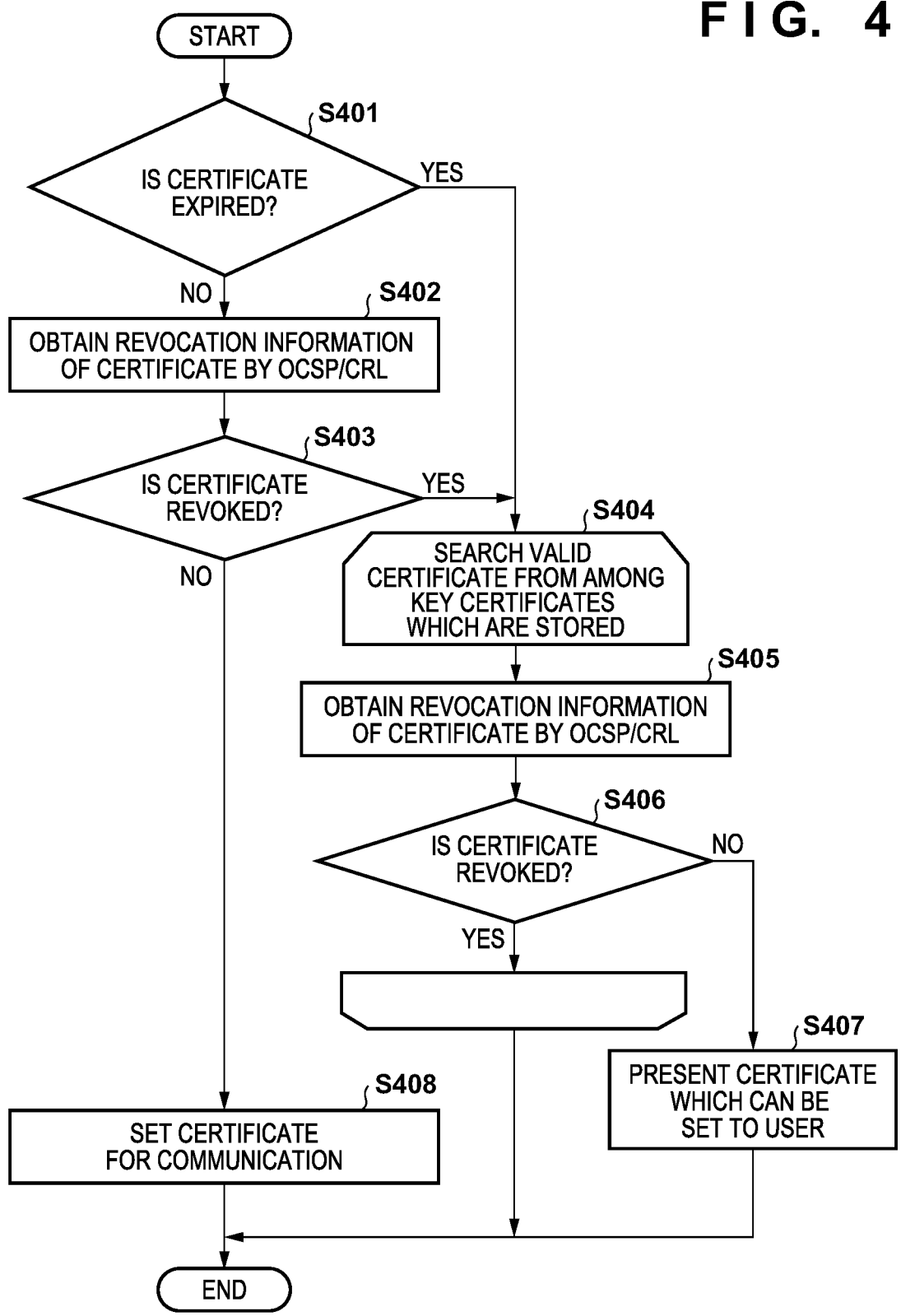
FIG. 4 is a flowchart for describing a process of setting a certificate for SSL/TLS communication in the multi-function peripheral according to the second exemplary embodiment.

FIG. 4 is a flowchart for describing a process of setting a certificate for SSL/TLS communication in the multi-function peripheral 100 according to the second exemplary embodiment. Note that the process described in the flowchart is achieved by executing a program deployed in the RAM 106 by the CPU 105. Note that this flowchart assumes that a certificate with signature is present in the certificates stored in the key certificate region of the HDD 108.

The process is started when a certificate for communication is selected by the user. First, in step S401, the CPU 105 obtains the information on the selected certificate, and determines whether or not the certificate is expired. Here, if it is determined that the certificate is expired, the process proceeds to step S404, and a searching process for a valid certificate stored in the HDD 108 is executed. If it is determined in step S401 that the certificate is not expired, the process proceeds to step S402, and the CPU 105 refers to the HDD 108 to obtain a revocation information list of the certificate or revocation information on an online certificate as in step S302 of FIG. 3. Then, the process proceeds to step S403, and the CPU 105 determines whether or not the certificate is revoked on the basis of the revocation information. The process proceeds to step S404 if it is determined that the certificate is revoked in step S403, whereas the process proceeds to step S408 when it is determined that the certificate is not revoked. In step S408, the CPU 105 sets the certificate as a certificate to be used for communication, and terminates the process.

In step S404, the CPU 105 refers to a list of a plurality of certificates stored in the key certificate region of the HDD 108 (FIG. 2A), and searches for a certificate in the certificates stored in the key certificate region one by one. Then, if a certificate is found in step S404, the process proceeds to step S405, and a revocation information list of the certificate or revocation information of an online certificate is obtained as in step S402. Then, the process proceeds to step S406, and the CPU 105 determines whether or not the found certificate is revoked on the basis of the revocation information. If the certificate is revoked, then the searching process from step S404 is continued. On the other hand, if it is determined in step S406 that the found certificate is not revoked, the process proceeds to step S407, and the CPU 105 presents, to the user, the certificate as a certificate which can be set for communication, and terminates the process.

The certificate which has been set for communication in the above-mentioned manner is used when communication between the multi-function peripheral 100 and the client PC 130 is executed.

According to the second exemplary embodiment, an unrevoked certificate can be presented to the user, and thus the user can avoid a certificate revocation error and the like during communication by setting the certificate as a certificate for communication.

The user can switch the certificate used for communication to an unrevoked certificate as in FIG. 2B from that in the setting screen of FIG. 2A. That is, the default digital certificate selected in the screen of FIG. 2A is not set for use in SSL, and therefore the user can switch the certificate so as to select "Key5" designated for use in SSL as illustrated in FIG. 2B.

In the above-mentioned manner, it is also possible to display on the operation unit 110 a list of valid digital certificates from among digital certificates stored in the HDD 108 so as to allow the user to select a desired digital certificate in the list via the operation unit 110.

As described above, in the second exemplary embodiment, an unrevoked certificate stored in the key certificate region is set for communication in a case that the certificate selected by the user is a revoked certificate, and thus highly reliable communication can be executed. Further, since a certificate revocation error which is caused when a revoked certificate is mistakenly set, and the like can be prevented, a disadvantageous influence on user's operability and usability can be prevented.

Other Embodiments

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-000769, filed Jan. 5, 2018, which is hereby incorporated by reference herein in its entirety.

What is claimed is:

1. An information processing apparatus, comprising:
    a storing unit configured to store digital certificates;
    a controlling portion having a processor that executes instructions stored in a memory or having a circuitry, the controlling portion functioning as:
    a selecting unit configured to select a digital certificate among the digital certificates stored in the storing unit in accordance with an instruction of a user;
    a first obtaining unit configured to obtain an expiration date of the digital certificate selected by the selecting unit;
    a second obtaining unit configured to obtain revocation information on the digital certificate selected by the selecting unit;
    a determining unit configured to determine validity of the digital certificate selected by the selecting unit on a basis of the expiration date obtained by the first obtaining unit and the revocation information obtained by the second obtaining unit; and
    a setting unit configured to set the digital certificate determined to be valid by the determining unit as a digital certificate for communication,
    wherein the storing unit stores a plurality of digital certificates; and
    wherein the controlling portion further functions as a presenting unit configured to search for a valid digital certificate in the plurality of digital certificates stored in the storing unit and to present the valid digital certificate to the user in a case that the determining unit determines that the digital certificate selected by the selecting unit is not valid.

2. The information processing apparatus according to claim 1, wherein the second obtaining unit is configured to obtain the revocation information from a certificate revocation list downloaded from a certificate authority or from an Online Certificate Status Protocol (OCSP) server.

3. The information processing apparatus according to claim 1, wherein the controlling portion further functions as a display unit configured to present, to the user, that the digital certificate is not allowed to be set as a certificate for communication in a case that the determining unit determines that the digital certificate selected by the selecting unit is not valid.

4. The information processing apparatus according to claim 1, wherein the presenting unit is further configured to display a list of valid digital certificates in the plurality of digital certificates stored in the storing unit to allow the user to select a digital certificate to be used from the list.

5. A method of controlling an information processing apparatus including a memory storing digital certificates, the method comprising:
    selecting a digital certificate among the digital certificates stored in the memory in accordance with an instruction of a user;
    obtaining an expiration date of the digital certificate selected in the selecting;
    obtaining revocation information on the digital certificate selected in the selecting;
    determining validity of the digital certificate selected in the selecting on a basis of the obtained expiration date and the obtained revocation information; and
    setting the digital certificate determined to be valid in the determining as a digital certificate for communication,
    wherein the memory stores a plurality of digital certificates, and
    wherein the method further comprises
    searching for a valid digital certificate in the plurality of digital certificates stored in the memory and presenting the valid digital certificate to the user in a case that the determining determines that the digital certificate selected in the selecting is not valid.

6. A non-transitory computer-readable storage medium storing a program for causing a processor to execute a method of controlling an information processing apparatus including a memory storing a digital certificate, the method comprising:
    selecting a digital certificate among the digital certificates stored in the memory in accordance with an instruction of a user;
    obtaining an expiration date of the digital certificate selected in the selecting;
    obtaining revocation information on the digital certificate selected in the selecting;
    determining validity of the digital certificate selected in the selecting on a basis of the obtained expiration date and the obtained revocation information; and
    setting the digital certificate determined to be valid in the determining as a digital certificate for communication,
    wherein the memory stores a plurality of digital certificates, and
    wherein the method further comprises
    searching for a valid digital certificate in the plurality of digital certificates stored in the memory and presenting the valid digital certificate to the user in a case that the determining determines that the digital certificate selected in the selecting is not valid.

* * * * *